Nov. 12, 1946.    S. I. CORY    2,410,809
TELEGRAPH SIGNAL DISTORTION MEASURING CIRCUIT
Filed Dec. 27, 1943

RECTIFYING PEAK VOLTMETER

INVENTOR
S. I. CORY
BY John E. Cassidy
ATTORNEY

Patented Nov. 12, 1946

2,410,809

UNITED STATES PATENT OFFICE 2,410,809

TELEGRAPH SIGNAL DISTORTION MEASURING CIRCUIT

Samuel I. Cory, Towaco, N. J., assignor to Bell Telephone Laboratories, Incorporated, New York, N. Y., a corporation of New York Application December 27, 1943, Serial No. 515,779

6 Claims. (Cl. 178—69)

This invention relates to telegraph signal distortion measuring circuits and more particularly to an improved distortion measuring circuit of the high-resistance, distributor-segment type, such as is disclosed in application Serial No. 300,299, W. Y. Lang, filed October 20, 1939, now Patent No. 2,340,224, granted Jan. 25, 1944. The invention herein represents an improvement over previously known distortion measuring circuits of the high-resistance segment type in that the high-resistance distributor segment is arranged in a potentiometer circuit instead of in a series circuit as formerly and the voltage due to the charge accumulated on the condenser, which is a measure of the distortion, is compared with a fixed standard voltage in a manner to provide an accurate indication of the sign and magnitude of the distortion.

An object of the invention is the improvement of distortion measuring circuits.

A more particular object of the invention is the improvement of distortion measuring circuits featuring high-resistance distributor segments, so as to obtain a more accurate quantitative indication of the magnitude of the distortion in a telegraph signal.

A feature of this invention is a high-resistance segment on a telegraph signal distributor connected in a manner so as to form with its traversing contact a variable potentiometer.

These and other features will become apparent from reference to the following description when read with reference to the associated drawing in which.

Figure 1:
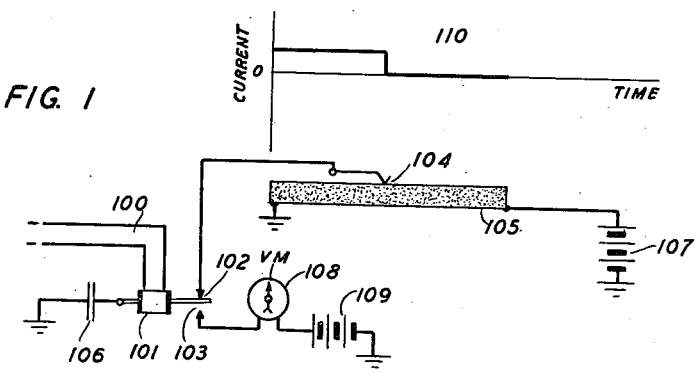
Fig. 1 is a circuit schematic showing the invention in simplified form.

Refer now to Fig. 1.

Incoming telegraph signal impulses are received through conductor 100 which is assumed to be connected at the left to a telegraph circuit incoming from a distant telegraph station. In response to the incoming signals, the armature of relay 101 is actuated to engage either contact 102 or contact 103 depending on the nature of the signal. Traversing brush 104 and high-resistance segment 105 are parts of a rotary telegraph distributor. The rotary telegraph distributor per se is well known in the telegraph art. The segment 105 physically is a segment of an annular ring. A brush arm carrying brush 104 is driven through a clutch by a motor. The clutch is under control of the incoming signals. This apparatus is not shown as its operation is well understood in the telegraph art. The distributor brush 104 and segment 105 are adjusted so that when there is no distortion present, that is, change in the duration of a signal element from standard, brush 104 will be equidistant from the ends of the high-resistance segment when a telegraph signal element is received by relay 101.

High-resistance segment 105 may be of any high-resistance material such as carbon or graphite. It may be metallic, including alloys, or non-metallic. It may be an element, chemical compound or mixture. As an illustration of a suitable mixture, segments may be formed of a mixture of graphite and liquid porcelain pressed into the desired form and hardened. Or mixtures of magnesium oxide or silicon dioxide with materials of higher conductivity, such as carbon or the like, may be employed. The segments may also comprise wire of high-resistance wound on a suitable core.

Positive battery of a definite standard potential, regulated within close limits, is connected to the right-hand end of high-resistance segment 105. The left-hand end of segment 105 is grounded. As thus arranged, segment 105 and its traversing contacting brush 104 form a potentiometer.

When the armature of relay 101 engages contact 102 a circuit extends from some point on the potentiometer, depending upon the position of brush 104 at the instant, through contact 102 to the right-hand terminal of condenser 106, the left-hand terminal of which is grounded. Condenser 106 is of small capacity. When contact 102 is closed, condenser 106 is charged to a potential dependent upon the position of brush 104 on segment 105.

When there is no distortion present, brush 104 will be equidistant the ends of segment 105 when the incoming signal element is received and contact 102 is opened. Under such condition the potential applied to condenser 106 will be one half that of battery 107. When contact 103 is closed the right-hand terminal of condenser 106 is connected through the armature of relay 101, contact 103, voltmeter 108 and positive battery 109 to ground. The potential of battery 109 is equal to one half the potential of battery 107. Under this condition there will be no deflection of the meter needle from its center zero position. If, however, the brush 104 is not equidistant the ends of segment 105 when the incoming signal is received, the potential applied to condenser 106 will differ from the potential of battery 109. The meter needle will be deflected to one side or the other, dependent upon whether the brush 104 is on one side or the other of its midposition on the segment. The direction of deflection will indicate the sign of the distortion, that is, whether the signal element is longer or shorter than a signal element of standard duration and the magnitude of the deflection will indicate the magnitude of the distortion. With a proper choice of apparatus elements an accurate indication of the magnitude of the distortion can be obtained.

The current-time graph 110 shows the pattern of portions of two consecutive signal elements and the transition between them. The transition, if there is no distortion present, will occur when brush 104 is equidistant the ends of segment 105. If distortion is present the transition, indicated by the vertical line between the current and no-current signal elements, will be displaced to the left or right.

Figure 2:
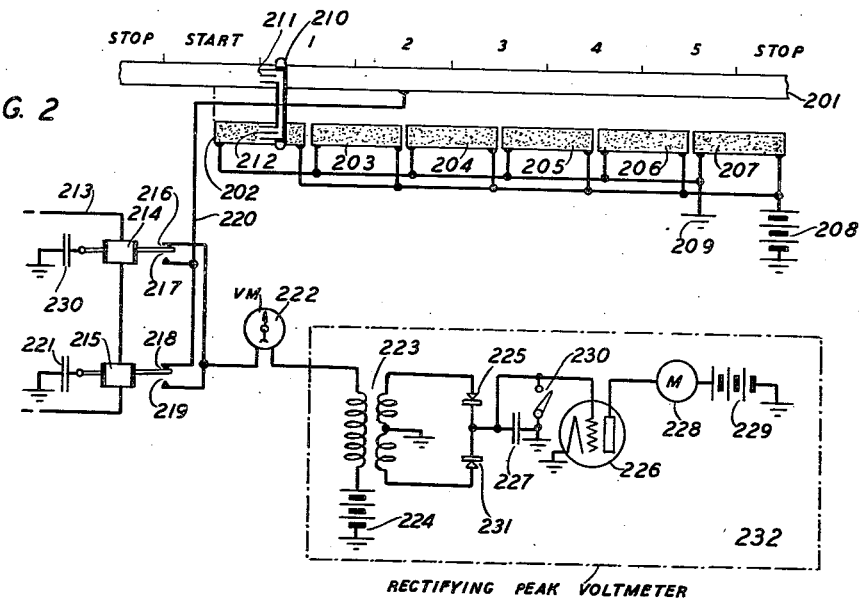
Fig. 2 is a circuit schematic showing the invention in more detail.

Refer now to Fig. 2. Fig. 2 is arranged to measure and indicate the sign and magnitude of the distortion in start-stop Baudot code signals. In Fig. 2 the solid annular conducting ring 201 and the segmented annular ring comprising high-resistance segments 202 to 207 are shown conventionally as developed. Positive battery 208 is connected to the right-hand end of each of the segments and ground 209 is connected to the left-hand end of each of the segments. Rotatable arm 210 sweeps over the face of the distributor from left to right. Secured to arm 210 are two interconnected brushes, 211, which engages ring 201, and 212 which engages high-resistance segments 202 to 207 in sequence.

Rotatable arm 210 is arrested between each successive train of start-stop Baudot code signals in a particular position known as the stop position. It is released in response to the reception of the first pulse of a train known as the start pulse. The mechanism which performs this function, as mentioned above, is not shown as it is well known in the art. High-resistance segment 202 is secured in position such that it extends equidistant each side of the position on solid ring 201 which marks the transition between the start signal element and the first character forming signal element of each signal train when the transition occurs at precisely the proper instant. Similarly, high-resistance segments 203 to 207 straddle the transition points between the succeeding signal elements 1 and 2, 2 and 3, 3 and 4, 4 and 5, and 5 and stop. There is no high-resistance segment corresponding to the transition between the stop and start signal element as the stop signal element terminates when arm 210 is arrested in the stop position and the start signal element controls the release of arm 210.

The transition between the stop and start signal elements represents the start of each train of signals and serves therefore as a fixed reference point.

Brush 210 is not shown in its stop position but is approximately at the transition point between the start signal element and the first signal element.

Signals incoming over conductor 213 control the armature of relays 214 and 215, moving them upward to engage their respective contacts 216 and 218 and downward to engage their respective contacts 217 and 219 in unison.

With the circuit in the condition shown a positive potential of a magnitude depending upon the position of brush 212 on segment 202 is applied through brush 211, ring 201, conductor 220 and contact 218 to the right-hand terminal of condenser 221. On the next transition of the armature of relay 215 to engage contact 219, the right-hand terminal of condenser 221 will be connected through contact 219, voltmeter 222, primary winding of transformer 223 of the rectifying peak voltmeter 232, which is well known in the art, and through positive battery 224 to ground. The potential of battery 224 is fixed at one half the potential of battery 208. When the transition between the start signal element and the first signal element occurs at precisely the proper instant, brush 212 will be equidistant the ends of segment 202 and the potential applied to condenser 221, which is of small capacity, will be the same as the potential of battery 224. When contact 219 is later closed there will be no pulse through the primary of transformer 223. As the position of brush 212 varies from midposition on segment 202, a potential which will be greater or less than the potential of battery 224 in corresponding amount will be applied to the upper terminal of the primary of transformer 223 and a positive or negative pulse equal to the difference between the potentials applied to the top terminal of the primary of the transformer 223 and the potential of battery 224 will result. The pulses will be rectified in the rectifier circuit comprising the oppositely poled rectifiers 225 and 231 connected to the secondary of transformer 223 and applied between the grid of tube 226 and ground and the left-hand terminal of condenser 227 and ground in parallel. Current proportional to the voltage pulses will flow from grounded positive battery 229 through ammeter 228 and tube 226 to ground. With miscellaneous telegraph signals from commercial circuits the transition points in the characters will be shifted from their normal positions by varying amounts. Under this condition meter 222 will indicate the sign and magnitude of the average distortion and meter 228 will indicate the magnitude of the peak or maximum distortion. After an observation, the charge on condenser 227 may be removed and meter 228 caused to indicate zero by operating "reset" key 230 momentarily.

Attention is called to the fact that the upper contact of relay 215 and the lower contact of relay 214 are connected in parallel to conductor 220. If it is assumed that the armatures of the relays are actuated to engage their upper contacts in response to a marking signal element and to engage their lower contacts for spacing, condenser 221 will be connected to the distributor on marking signal elements and condenser 230 on spacing signal elements. Further, each of these two condensers will be connected to the rectifying peak voltmeter when the other is connected to the distributor.

The operation of the circuit per Fig. 2 on transitions between the other signal elements corresponds to that described for the transition between the start signal element and signal element 1.

What is claimed is:

1. In a telegraph system, a telegraph signal distortion measuring circuit comprising a variable potentiometer including a high resistance element, a displaceable contact engaging said element, means for displacing said contact along said element from a fixed reference in proportion to variations in the durations of telegraph signal impulses, means for charging a condenser through said potentiometer and said contact continuously during an interval while said contact is being displaced uniformly along said element and means for controlling the initiation and termination of said charging in response to received telegraph signal elements.

2. In a telegraph system, a telegraph signal distortion measuring circuit comprising a high resistance variable potentiometer, a contact engaging a high resistance segment on said potentiometer, means for displacing said contact, from a reference position, uniformly along said segment continuously during an interval corresponding to the variation in duration of a received signal element from a signal element of standard duration, and means for comparing the output potential of said potentiometer with a fixed potential in response to a received telegraph signal to indicate the sign and magnitude of distortion of said signal.

3. In a telegraph system, an automatically variable potentiometer connected through a contact on a telegraph signal receiving relay to a condenser, said potentiometer comprising a high resistance segment and a displaceable contact arranged to continuously traverse a portion of said segment uniformly while a telegraph signal element is being received, means dependent on the termination of said signal element by said relay for determining the magnitude of the potential impressed through said potentiometer on said condenser and means for comparing the potential impressed on said condenser with a fixed standard potential to indicate the magnitude and sign of distortion in said signal element.

4. In a telegraph system, a rotary distributor, a high resistance variable potentiometer thereon comprising a segment of high resistance and a rotatable contact engaging said segment, a condenser charging circuit including said potentiometer extending through a contact on a telegraph receiving relay, means responsive to the reception of a telegraph signal by said relay for controlling the charging of said condenser, and means for determining distortion in a received telegraph signal dependent on the magnitude of the charge on said condenser.

5. In a telegraph signal distortion measuring circuit, a variable potentiometer having a displaceable contact, means for positioning said contact in a first position at the instant a transition in a distortionless signal element occurs so that the potential impressed through said contact on a connected circuit equals a standard potential, and means for comparing variations from said standard potential due to the uniform displacement of said contact from said first position continuously during the interval while a distorted signal is being received to measure the distortion in said signal.

6. In a telegraph signal distortion measuring circuit, means for varying a potential impressed on a circuit in proportion to changes in duration of a signal element from signals of standard duration, said means comprising a rotary distributor having a potentiometer thereon, said potentiometer including a rotatable contact engaging a high resistance segment and means for comparing said varying potential with a standard potential to indicate the sign and magnitude of the changes in the duration of said signal.

SAMUEL I. CORY.